Patented May 10, 1938

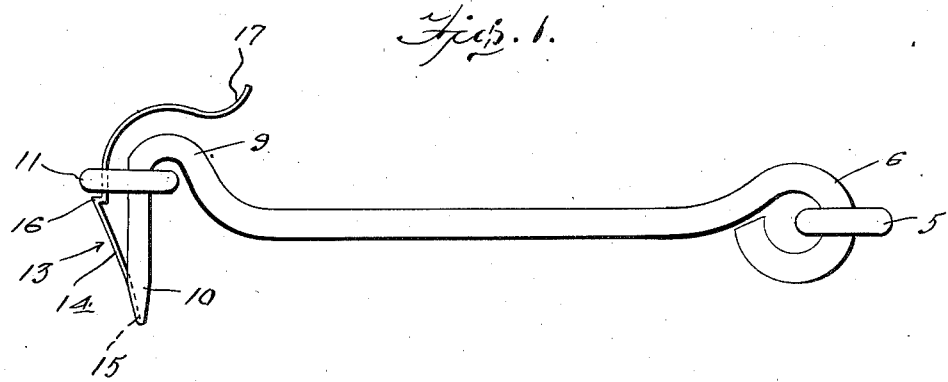
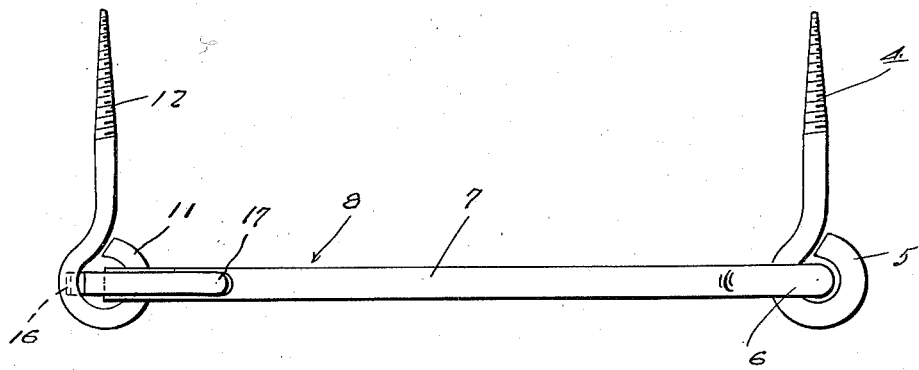
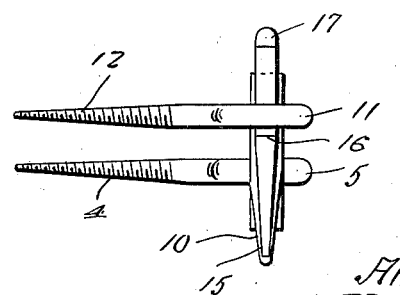

2,117,159

UNITED STATES PATENT OFFICE 2,117,159

HOOK AND EYE DOOR FASTENER

Vincent Giardina and Andrew Primos, New Orleans, La., assignors, by direct and mesne assignments, to American Safety Hook Co., Inc., New Orleans, La., a corporation of Louisiana Application March 8, 1937, Serial No. 129,751

3 Claims. (Cl. 292—107)

This invention relates to a swingable or pivoted hook and eye fastener of the type generally used on screen doors, and it has reference in particular to an attachment for the bill of the hook, which attachment is constructed to function as a safety catch or latch to guard against accidental displacement of the hook from the associated receiving and keeper eye.

An important object and purpose of this safety hook is to provide a hook which can be operated with ease and which possesses all the advantages of the ordinary hook of this type, plus the added advantages and improvements of a spring safety catch which locks the said hook in position when once it has been snapped into the socket or eye of the hook and eye combination.

A further and important object of the said safety hook is to provide a hook that it is impossible to open by prying, or by simply lifting the hook, as is the case in the ordinary hook, my safety hook being so constructed that the hook cannot be removed from the socket or eye of the hook and eye combination, except when the safety spring catch is depressed and held down while the hook is being removed from the said socket or eye.

A still further object of the invention is to provide a reliable manually controllable detent-equipped catch having a finger trip or releasing element projecting through and beyond the accommodation eye and conforming somewhat to the hump of the hook which it overlies, whereby to dispose it in a conveniently accessible position and to at the same time insure the desired safeguarding aspects of the conception.

Other features and advantages will become more readily apparent from the following description and drawing.

In the accompanying illustrative drawing, wherein like numerals are employed to designate like details or elements throughout the views:

Figure 1 is an elevational view of the complete assemblage disclosing how the safety latch is constructed, mounted, and utilized.

Figure 2 is a top plan view of the assemblage seen in Figure 1.

Figure 3 is an end view of Figure 1 observing it in a direction from left to right.

Referring now to the drawing by distinguishing reference numerals, it will be observed that the anchoring eye screw is denoted by the numeral 4, the eye per se being denoted by the numeral 5. This serves to accommodate the companion eye 6 on one end of the shank or reach member 7, of the hook unit 8. This part 7 is provided with the customary bent hook 9 whose bill 10 is of regular pointed form to slip down through the receiver or retention eye 11 on the associated eye screw 12.

The safety accessory or attachment in the form of a combined guard and latch is denoted by the numeral 13. It is constructed from durable suitably resilient steel and is characterized by an attaching tang 14 soldered or otherwise fastened to the bill 10, as indicated at the point 15. From this point it spreads or diverges in acute angular relationship away from the bill 10. At the point 16 it is bent laterally to form a retention shoulder or detent releasably engageable with the under edge of the associated keeper eye 11. From this point it swings into a bow spring which is disposed in conforming parallelism with the bend 9. The extreme free end is deflected into a compound curve to form a convenient finger hook 17. Thus, the latch 13 circumscribes or embraces the hook made up of the portions 9 and 10, and in so doing provides an innovation in a safety latch fastener of this type.

In practice it is obvious that the presence of this catch 13 does not interfere materially with the separable connection of the hook 10 with its associated retention or receiver eye 11. That is to say, by simply swinging the hook in the customary limited arcuate path in alignment with the eye, it enters and passes through said eye at which time the outstanding spring 14 rides in a cam-like manner through the eye. The inherent resiliency of the free end portion of the latch causes the detent 16 to snap beneath the eye, as depicted in the operative association seen in Figure 1. Thus, in order to release the detent, it is necessary to depress the bow spring through the instrumentality of the conveniently and safely located finger piece 17. This finger-controlled trip action latch constitutes a dependable safety contrivance for association with a simple hook and eye door fastener of the type illustrated.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

We claim:

1. In a device of the class described, a pivoted hook having an attaching eye-screw, a safety latch attached to the bill of the hook, said latch comprising a strip of resilient steel attached at one end to the bill of the hook and having its opposite end fashioned to conform to the bend of the hook in substantial spaced parallelism, the free end of said latch being formed into a finger piece overlying the shank portion of said hook.

2. In a structure of the class described, a hook unit having pivotal attaching means at one end and a hook at the opposite end releasably engageable with the customary keeper eye, and a safety guard latch attached to the bill portion of said hook, said latch comprising an outwardly diverging portion having a laterally bent shoulder constituting a detent, a longitudinally bowed portion beyond said detent, and terminating in a finger piece, said finger piece and bowed portion being disposed in spaced relation and conforming to the hump of the hook in the manner and for the purposes described.

3. In a hook and eye door fastener construction of the class described, a screen door hook comprising a shank having pivotal anchoring means at one end, the opposite end of said shank being laterally off-set and bent upon itself into a right angularly disposed retention hook adapted for passage through a conventional complemental keeper eye, and a safety spring latch comprising a strip of resilient metal attached at one of its ends, to the terminating bill of said hook and branching laterally therefrom in diverging relation, the intermediate portion of said strip being bent at right angles in relation to the retention hook to provide a detent for coaction with the keeper eye, said detent being located on a plane below the aforementioned lateral bend forming the juncture between the shank and retention hook, that portion of the latch strip adjacent said detent being formed into an outwardly bowed trip, said trip overlying the bend in spaced relation and having its free end extended to a position overlying the shank, the free end being flared laterally and outwardly to provide a convenient finger engaging and depressing member.

VINCENT GIARDINA.
ANDREW PRIMOS.